Patented May 9, 1939

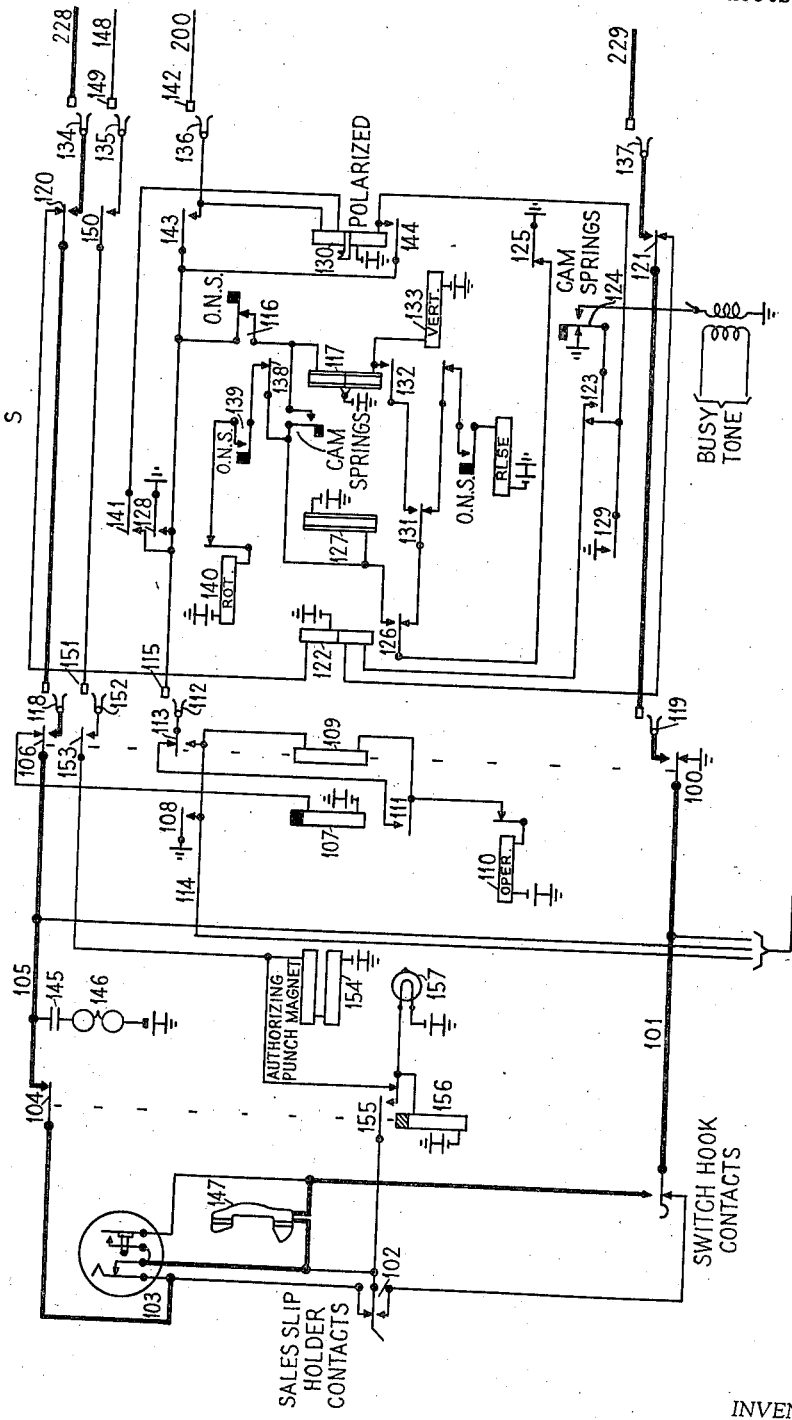

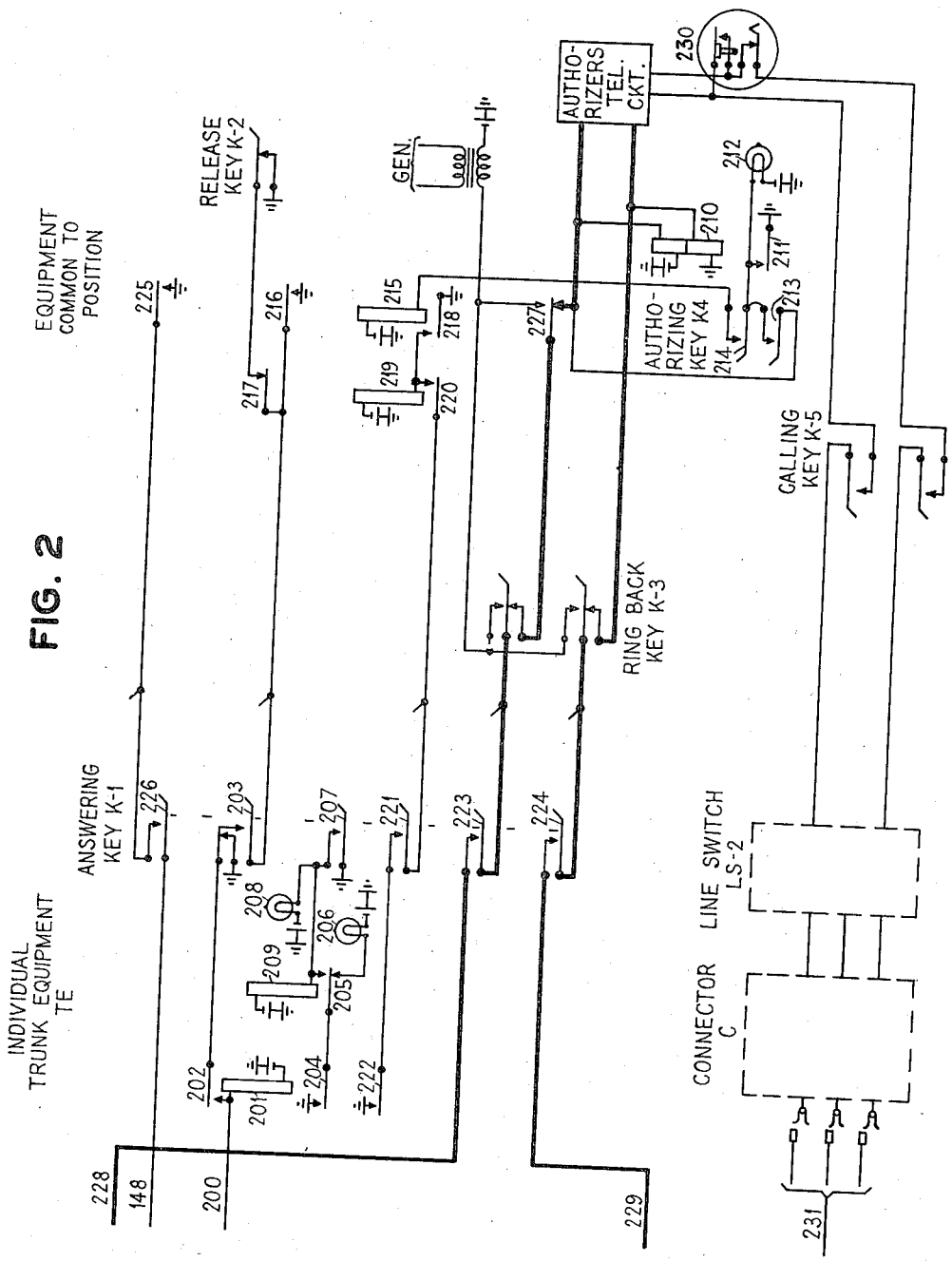

2,157,860

UNITED STATES PATENT OFFICE 2,157,860

SIGNALING SYSTEM

Martin L. Nelson, Park Ridge, Ill., assignor to Associated Electric Laboratories, Inc., Chicago, Ill., a corporation of Delaware Application December 23, 1936, Serial No. 117,261

9 Claims. (Cl. 179—2)

The present invention relates in general to signaling systems and is of particular utility in connection with a system wherein a central information bureau dispenses information to a plurality of substations.

The particular form of the invention which is hereinafter set forth in detail is designed for use in mercantile establishments having an extensive credit system. In the credit department of such an establishment is kept a complete file showing the names of credit customers and cumulative information as to the status of their accounts. In this department, because of the large number of accounts, it is usually necessary to divide the records and to employ an authorizer to care for each subdivision thereof. This division of work makes it desirable to provide credit telephone stations whereby a sales person, before extending further credit to a particular customer, may directly and without delay communicate with the authorizer who has before her information concerning the status of that customer's account.

Each credit telephone station is an automatic station having the usual, talking, signaling and impulse sending instrumentalities and is connected with the central station by a line circuit terminating in a line switch individual thereto. The resulting plurality of line switches have access, in the usual manner, to a smaller number of selector switches of the well known vertical and rotary type.

For the purpose of explanation, it will be assumed that the credit records have been divided into ten groups, corresponding to the digits 1 to 0, inclusive, appearing in the telephone dial. It will further be assumed that each such subdivision has an authorizer in attendance.

The outline of the system may now be completed by stating that each level in the banks of the aforementioned selector switches are trunked to an authorizing position, and the primary object of the invention may be said to be the provision of means whereby a sales person may establish telephone communication with an authorizer who has access to the credit records of the particular customer whose account is to be verified.

A further object of the invention is the provision of a sales slip holder as part of each credit telephone station, into which the sales person may place a sales slip written up as a result of the current transaction, and means whereby said sales slip may be perforated through instrumentalities operable by the authorizer as a permanent record that credit was authorized thereon.

Another object of the invention is the provision of means whereby an authorizer may establish telephone communication with any desired credit telephone station.

These and other objects and features, not specifically pointed out, will be apparent by referring to the accompanying drawings which together with the detailed description constitute the preferred embodiment of the invention.

The invention is illustrated in two sheets of drawings, comprising Figs. 1 and 2. Fig. 2, when placed to the right of Fig. 1, with adjoining lines in alignment, diagrammatically illustrates the apparatus and circuits of the invention.

In Fig. 1 is shown a credit telephone station T—1 which, in addition to the usual talking, signaling and impulse sending instrumentalities, is provided with a combined sales slip holder and authorizing punch. The mechanical relation of the two latter mentioned devices is such that the insertion of a sales slip into the sales slip holder will result in the actuation of the sales slip holder contacts 102, the sales slip then being in position to be perforated by the authorizing punch should the authorizing punch magnet 154 be energized.

The line switch LS—1 is mechanically of the well known rotary type in which the wipers have no normal position and move in a forward direction only.

The selector switch S is mechanically of the well known Strowger vertical and rotary type in which the bank contacts are arranged in horizontal rows or levels.

In Fig. 2 is shown equipment individual to each trunk accessible from a given level in the bank of selector S, this equipment comprises relays 201 and 209, hold lamp 208, answering lamp 206, and answering key K—1.

The equipment common to each authorizing position comprises relays 219, 215, and 210, release key K—2, ring back key K—3, authorizing key K—4, calling key K—5, the impulse transmitting device 230 and the authorizer's telephone circuit shown in skeleton form.

The line switch LS—2 and the connector C, shown in skeleton form, indicate a switch train available for use by the authorizer when desiring to establish communication with a credit authorizing telephone station such as T—1 of Fig. 1. The line switch LS—2 is similar in all respects to the line switch LS—2 of Fig. 1. The connector C is of the well known Strowger vertical and rotary type in which the bank contacts are arranged in horizontal rows or levels.

Sales person calls authorizer

The system having been described in general a detailed description will now be given of its operation. For this purpose it will be assumed that a sales person has written up a sales ticket and inserted same in the sales slip holder of credit telephone station T—1, thereby closing a circuit from ground at the break contact of armature 100, line conductor 101, break contact of switch hook, make contact and spring 102, dial interrupter springs 103, armature 104, line conductor 105, armature 106 and its break contact, through line relay 107 to battery.

Line relay 107, upon energizing, closes at armature 108 a circuit for switching relay 109 and operating magnet 110 in series, and at armature 111 connects the test wiper 112 to a point in the circuit between switching relay 109 and the operating magnet 110. From this point the operation depends upon whether the trunk line upon which the wipers of the line switch are standing is busy or idle. In the event that it is busy, ground potential on the contact occupied by test wiper 112 will shunt out switching relay 109, and the operating magnet 110 will energize and interrupt its own circuit in the manner of a buzzer to advance the switch wipers step by step in search of an idle trunk line. When the wipers reach the first idle trunk, which we will assume is that leading to selector S, the switching relay is no longer short circuited. The operating magnet 110 cannot energize in series with the switching relay 109 because of the latter's high resistance. The switching relay 109 will, however, energize and at armature 113 disconnects the test wiper 112 from the point between its own winding and that of operating magnet 110 and connects it to the grounded private normal conductor 114. Relay 109 also functions to disconnect the line conductors 105 and 101 from relay 107 and ground, respectively, and extends the connection to selector S.

Slow-to-release line relay 107 will remain in an operated position for a short interval of time after its circuit is opened by relay 109 and, during this interval, a circuit is closed from ground at armature 108, make contact and armature 113, wiper 112, bank contact 115, off normal spring 116, through the upper winding of slow-to-release relay 117 to battery. Relay 117 now energizes and at armature 123 completes a circuit whereby the connection from line conductors 105 and 101 is extended through armatures 106 and 100 and their make contacts, wipers 118 and 119 and the contacts upon which they are standing, armatures 120 and 121 and their break contacts to the upper winding of line relay 122 to battery and through the lower winding of said relay, by way of make contact and armature 123, to ground at the break contact of cam spring 124.

Line relay 122 will now energize and close a circuit from ground at armature 125, armature 126 and its make contact, through slow-to-release relay 127 to battery. Relay 127, upon energizing, supplies ground at armature 128 to relay 109 and the upper winding of relay 117, thereby maintaining said relays energized after the deenergization of line relay 107. Relay 127 also closes a circuit from ground at armature 129 through the polarizing winding of switching relay 130, but without effect at this time. The polarized switching relay 130 is similar in construction and operation to the relay disclosed in Patent No. 1,673,884, issued June 19, 1928, to H. C. Pye. A relay of this type will not energize by virtue of the polarizing winding acting alone, but will energize only when the operating winding is energized in a direction to assist the polarizing winding. It may be stated further that, when once energized, the relay will remain operated by virtue of the polarizing winding acting alone.

We will next assume that the sales person desires the authorizer in charge of division two, and consequently dials the digit 2. Line relay 122 follows the impulses in the dialed digit and at each deenergization opens the circuit of slow-to-release relay 127, but without effect at this time. At each deenergization of line relay 122 a circuit is closed from ground at armature 125, armature 126 and its break contact, armature 131 and its make contact, armature 132, through the lower winding of relay 117 in parallel with vertical magnet 133 to battery. Vertical magnet 133 is energized in response to each impulse to step the wipers 134 to 137, inclusive, one step in a vertical direction, while slow-to-release relay 117 is maintained in an operated position during the dialling period. At the first vertical step the various off normal springs ONS change position. In this connection it is to be noted that off normal spring 116 opens the circuit to the upper winding of relay 117, but without effect at this time.

Line relay 122 is maintained energized after the dialling period, and shortly thereafter slow-to-release relay 117 deenergizes and at make before break armature 123 substitutes ground at armature 129 in place of ground at the break contact of cam spring 124. Relay 117, upon deenergizing, also closes a circuit from ground at armature 129, contacts controlled by armature 123, armature 126 and its make contact, armature 138, off normal springs 139, through self interrupting contacts and rotary magnet 140 to battery. Rotary magnet 140 will now energize and interrupt its own circuit, thus operating in the manner of a buzzer to advance wipers 134 to 137, inclusive, in a rotary direction until such time as a circut is completed for the polarized switching relay 130. Selector S is of the battery searching type and therefore the polarized switching relay 130 will not energize until the test wiper 136 encounters a bank contact having battery potential thereon, which potential indicates an idle trunk to an authorizing position.

We will next assume that the trunk leading to individual trunk equipment TE of Fig. 2 is the first idle trunk in the group leading to the second authorizing position and, when test wiper 136 engages the test contact 142, a circuit is closed from ground at armature 128, armature 141, upper winding of relay 130, test wiper 136, test contact 142, conductor 200, through relay 201 to battery. The current in the upper winding of relay 130 is in a direction to assist that in the lower winding and the relay will quickly energize and stop the rotation by opening the circuit to the rotary magnet, and to relay 127, at armature 125.

Relay 201 will energize in series with the upper winding of relay 130 and will lock itself up, by way of armature 202, to ground at contacts controlled by spring 203 of answering key K—1. Relay 130 also functions to lock its lower winding, by way of armature 144, to ground at armature 128; to extend back the grounded conductor 200, by way of armature 143, so as to replace ground now supplied at armature 128; and to switch the calling loop from the windings of line relay 122 to the talking conductors extending to trunk equipment TE, by way of armatures 120 and 121.

A further result of the energization of relay 201 is the closing of a circuit from ground at armature 204, armature 205 and its break contact, through answering lamp 206 to battery. The authorizer, at her convenience, will answer the call on trunk TE by operating the associated answering key K—1, whereupon a circuit is established from ground at spring 207 through hold lamp 208 and relay 209 in parallel to battery. Relay 209 will now energize and lock itself, by way of armature 205, to ground at armature 204, at the same time extinguishing the answering lamp 206. It is to be noted that the hold lamp 208 is now under control of relay 201. The calling loop is now extended by way of springs 223 and 224 of key K—1 and break contacts of ring back key K—3 to the battery feed relay 210. Relay 210 will now energize, for the reason that the calling loop is closed at the contacts of the sales slip holder 102, and close the circuit of lamp 212 at armature 211. The lighting of lamp 212 is an indication to the authorizer that a sales slip is inserted in the sales slip holder of the originating credit telephone.

*Authorizer recalls sales person*

The credit authorizer will now momentarily operate the ring back key K—3 thereby impressing battery, upon which the generator has been superimposed, on both sides of the calling loop, the circuit being complete through condenser 145 and ringer 146 to battery at credit telephone station T—1. The sales person, in response to the operation of the ringer, will remove the handset 147 from the switch hook and converse with the authorizer whose telephone circuit is now across an extension of the calling loop. The sales person will state the customer's name or account number together with the amount of the sale, and will then replace the handset 147. The authorizer will next look up the status of the customer's account and either "authorize the sale" or recall the sales person in order to inform her that credit has been refused.

*Authorizer allows credit*

When credit is to be allowed, the authorizer will momentarily operate the authorizing key K—4, thereby extending a holding circuit from ground at armature 211, spring 213 of said key, through the upper winding of relay 210 to battery. At the same time a circuit is closed from ground at armature 211, spring 214 of said key, through relay 215 to battery. Relay 215, upon energizing, will supply a holding ground for relay 201 at armature 216, and will close an obvious circuit through relay 219. Relay 219, upon energizing, will lock itself up by way of armature 220 and spring 221 of key K—1 to ground at armature 222. Relay 215 will also function to impress battery, upon which generator has been superimposed, upon one side of the calling loop at armature 227, the circuit therefore being complete through condenser 145 and ringer 146 to battery at credit telephone station T—1.

A further function of relay 215 is the closing of a circuit from ground at armature 225, spring 226 of key K—1, conductor 148, bank contact 149, wiper 135, armature 150, bank contact 151, wiper 152, armature 153, through authorizing punch magnet 154 to battery, a circuit parallel thereto extends by way of springs controlled by armature 155 through relay 156 in parallel with lamp 157 to battery. The punch magnet 154 will now energize and perforate the sales slip as an indication that credit has been authorized thereon.

Slow-to-release relay 156 will energize and lock itself up by way of armature 155 and the lower part of the calling loop to ground through the lower winding of relay 210, and at armature 104 opens the upper part of the calling loop. When the authorizing key is restored, relay 215 will deenergize and remove ground from the circuit of relays 201, 130 and 109, thereby causing the release of line switch LS—1 and selector S. It is apparent that slow-to-release relay 156 will remain energized, its circuit now being complete at the break contact of armature 100.

The sounding of the ringer 146 and the lighting of the lamp 157 will indicate to the sales person that the transaction has been approved, whereupon she will remove the sales slip from the sales slip holder, thus opening the circuit of relay 156 and lamp 157.

Relay 201, upon deenergizing, will open the circuit of relays 209 and 219 and hold lamp 208. The authorizer will now restore the answering key K—1, thus completing the cycle of operations required when credit on the transaction in question is authorized.

*Authorizer refuses credit*

When credit is to be refused, the authorizer will recall the sales person by a momentary operation of the ring back key K—3. The sales person, in response to the sound of ringer 146, will remove the hand set 147 and receive her instructions from the authorizer. The sales person will then restore the handset and remove the sales slip from the sales slip holder, thus restoring sales slip holder contacts 102 to normal position, and thereby opening the circuit of relay 210. Relay 210 will next deenergize and extinguish lamp 212 as an indication to the authorizer that she may now release the connection. The authorizer next operates the release key K—2, thereby removing ground from the circuit of relays 201, 130 and 109. Selector S and line switch LS—1 release in the usual manner. Relay 201, upon deenergizing, opens the circuit of hold lamp 208 and relay 209. The extinguishment of hold lamp 208 is an indication to the authorizer that she may restore listening key K—1, thus completing the cycle of operations required when credit on the transaction in question is to be refused.

In the event that the authorizer desires to call a credit telephone station, such as T—1, she may operate the calling key K—5, thereby associating her telephone circuit and the dial 230 with the switch train diagrammatically indicated by line DS—2 and connector C.

While the invention has been shown as a combined telephone and credit authorizing system, it will be understood that the authorizing system could be utilized equally as well for other purposes wherein a central information bureau dispenses information of a character such that a permanent record of the same is desirable.

The object and scope of the invention having been described, what is considered to be new and what is desired to have protected by Letters Patent, will be pointed out more specifically in the appended claims.

What is claimed is:

1. In a combined telephone and signaling system, a plurality of originating stations, a central station, a plurality of receiving stations located at said central station, means operable at one of said originating stations to establish an intercommunicating connection between said originating station and any desired receiving station, a sales slip inserted in a sales slip holder forming a part of said originating station, and means at a receiving station for placing an indication upon said sales slip and for bringing about the release of said connection.

2. In a combined telephone and signaling system, a plurality of originating stations having talking, signaling, and impulse sending instrumentalities and in addition thereto a sales slip holder, a central station, a plurality of receiving stations located at said central station, means at one of said originating stations for preventing the establishment of an intercommunicating connection between said originating station and a desired receiving station unless a sales slip is inserted in said sales slip holder, and means controlled at a receiving station and the cooperating originating station to place an indication upon said sales slip.

3. In a combined telephone and signaling system, a plurality of originating stations having talking, signaling, and impulse sending instrumentalities and in addition thereto a sales slip holder, a central station, a plurality of receiving stations located at said central station, means at one of said originating stations for preventing the extension of a connection to a desired receiving station unless a sales slip is inserted in said sales slip holder, means controlled at said receiving station and the cooperating originating station for simultaneously signaling said originating station over said connection and for placing an indication upon said sales slip, and means at said receiving station to release said connection without placing an indication upon said sales slip.

4. In a combined telephone and signaling system, a calling station, a called station, automatic switches, means at said calling station for controlling said automatic switches to extend an incomplete talking connection to said called station, a source of ringing current, means at said called station for transmitting said ringing current over said connection to signal said calling station, and means operated responsive to the removal of the receiver at said calling station for completing the incomplete talking connection to said called station.

5. In a combined telephone and signaling system, a first station, automatic switches, a plurality of other stations accessible to said first station via said switches, means at said first station for performing an initial operation to control a portion of said switches without removal of the station receiver, an impulse sender at said first station for controlling the remaining switches to extend a connection to a desired one of said other stations, said impulse sender only effective to perform said controlling operations when said means has been satisfactorily operated and is still in effect.

6. In a combined telephone and signaling system, an originating station, a plurality of receiving stations, controlling means at said originating station for extending a connection therefrom to a desired one of said receiving stations, a card holder at said originating station, means automatically operated responsive to the insertion of a card in said holder for preparing said controlling means for operation, and locking means at said originating station operable from the selected receiving station for preventing the extension of another connection from said originating station as long as said card remains in said holder.

7. In a combined telephone and signaling system, a substation, a plurality of central office stations, automatic switches controllable from said substation to extend a connection to any desired central office station, a card receiver at said substation, means associated with said card receiver controlled responsive to the insertion of a card therein for preparing said automatic switches for the extension of a connection, an impulse sender at said station for further control of said switches to extend the connection to a desired central office station, means controlled from the selected central office station for placing an indication on the inserted card, means at said selected station for controlling the release of said switches, and locking means at said substation operated in conjunction with the placing of an indication on said card for preventing said switches from again being operated from said substation until the means controlled by said inserted card has been restored to normal.

8. In a combined telephone and signaling system, a plurality of automatic switches, a plurality of originating stations having access to said switches, a plurality of central office receiving stations, a sales ticket holder at each of said originating stations, means at each originating station actuated only by the insertion of a sales ticket in an associated ticket holder for preparing said switches for the extension of a connection, an impulsing device at each of said originating stations for controlling said switches to select any one of said receiving stations, said impulsing devices effective to control said switches only during the time a sales ticket is in an associated ticket holder.

9. In a signaling system, a calling station, a called station, means at said calling station for extending an incomplete talking connection to said called station before the receiver at the calling station is removed, a source of ringing current, means at said called station for transmitting said ringing current over said connection to signal said calling station, and means operated responsive to the removal of the receiver at said calling station for completing said incomplete talking connection to said called station.

MARTIN L. NELSON.